(12) United States Patent
Ouchi et al.

(10) Patent No.: US 6,932,516 B2
(45) Date of Patent: Aug. 23, 2005

(54) SURFACE OPTICAL DEVICE APPARATUS, METHOD OF FABRICATING THE SAME, AND APPARATUS USING THE SAME

(75) Inventors: Toshihiko Ouchi, Kanagawa (JP); Hajime Sakata, Kanagawa (JP); Futoshi Hirose, Kanagawa (JP); Aya Imada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 251 days.

(21) Appl. No.: 09/903,709

(22) Filed: Jul. 13, 2001

(65) Prior Publication Data

US 2002/0025122 A1 Feb. 28, 2002

(30) Foreign Application Priority Data

Jul. 19, 2000 (JP) ........................................ 2000-218163
Jan. 22, 2001 (JP) ........................................ 2001-012593

(51) Int. Cl.[7] .............................................. G02B 6/36
(52) U.S. Cl. ....................................................... 385/88
(58) Field of Search ............................. 385/88, 93, 94, 385/89

(56) References Cited

U.S. PATENT DOCUMENTS

| | | | | |
|---|---|---|---|---|
| 5,434,939 A | * | 7/1995 | Matsuda | 385/88 |
| 5,574,806 A | * | 11/1996 | Kragl et al. | 385/14 |
| 5,790,730 A | * | 8/1998 | Kravitz et al. | 385/49 |
| 5,946,438 A | * | 8/1999 | Minot et al. | 385/88 |
| 6,332,721 B1 | * | 12/2001 | Inokuchi | 385/93 |
| 6,527,455 B2 | * | 3/2003 | Jian | 385/88 |
| 6,568,863 B2 | * | 5/2003 | Murata | 385/89 |
| 6,626,585 B1 | * | 9/2003 | Malone | 385/88 |

FOREIGN PATENT DOCUMENTS

| | | |
|---|---|---|
| JP | 6-237016 | 8/1994 |
| JP | 8-111559 | 4/1996 |
| JP | 11-307869 | 11/1999 |

* cited by examiner

Primary Examiner—Robert H. Kim
Assistant Examiner—Richard H Kim
(74) Attorney, Agent, or Firm—Fitzpatrick, Cella, Harper and Scinto

(57) ABSTRACT

A surface optical device apparatus includes a surface optical device capable of emitting or receiving light through a surface thereof and a thick layer formed of a radiation-curable or electron-beam-curable material, such as a polymerizable resist. In the thick layer, a guide hole for inserting an end portion of a light-transmission member, such as an optical fiber, and a plastic optical fiber with a flat end face or a lens-shaped end face, therein is formed at a position corresponding to the surface of the surface optical device such that the surface optical device can be optically coupled to the light-transmission member inserted in the guide hole. The guide hole is formed in the thick layer by performing a patterning on the thick layer using photolithography to selectively harden the thick layer and developing the thick layer.

44 Claims, 16 Drawing Sheets

SURFACE OPTICAL DEVICE APPARATUS, METHOD OF FABRICATING THE SAME, AND APPARATUS USING THE SAME

BACKGROUND OF THE INVENTION

1. Field of the Invention

This invention relates to a surface optical device apparatus which can be optically coupled to a light-transmission member, such as an optical fiber, readily and effectively, an optical apparatus which includes the surface optical device apparatus and a light-transmission member optically coupled to this surface optical device apparatus accurately and effectively, its fabrication method, an optical wiring device using the optical apparatus, and related structures and devices. The surface optical device apparatus and optical apparatus are also referred to as an optical interconnection module or the like in this specification.

2. Related Background Art

In recent years, an optical module for fast optical interconnection has been developed. However, there are a number of problems concerning the connection between the optical module and an optical device or a light-transmission member, such as an optical fiber, particularly from the standpoint of cost and performance.

A surface device is chiefly used as a light-receiving device among optical devices since this is advantageous in fabrication ease and sensitivity. In this case, when a principal surface of the surface device is to be coupled to an optical fiber at a relatively low cost, the surface device needs to be passively aligned with the optical fiber while not in operation. For this purpose, a method of assembling the devices with a fixing member is ordinarily employed. In such a case, however, mechanical precision of the fixing member is required, there exist limitations with respect to its elastic coefficient and thermal expansion efficient, and the number of components increases. Hence, a decrease in cost is difficult. Particularly, where plastic molding is used to reduce the cost, yield and long-term reliability in the optical coupling are lowered.

With a light-emitting device also, a vertical cavity surface emitting laser (VCSEL) for emitting light perpendicularly to its substrate face is being energetically researched and developed, as the VCSEL has a possibility of reducing power consumption and cost of an optical interconnection module. In VCSEL, its threshold is low (approximately less than 1 mA), inspection on a wafer level is possible, and no cleavage precision is needed. Its cost can be thus lowered. However, in an optical coupling between such a laser and an optical fiber also, the problems similar to the above still exist.

In the above-discussed situation, there has been proposed a method of forming a fiber guide hole for coupling an optical device to an optical fiber with a precision of photolithography. For example, Japanese Patent Application Laid-Open No. 8(1996)-111559 discloses a method of etching a hole for fixing an optical fiber 1037 to the side of a substrate 1021 with a surface light-receiving or light-emitting device, as illustrated in FIG. 1. In FIG. 1, there are also illustrated a light absorbing layer 1022, distributed Bragg reflector (DBR) mirrors 1023 and 1027, cladding layers 1024 and 1026, an active layer 1025, a contact layer 1028, an $SiO_2$ layer 1032, electrodes 1033 and 1035, and an anti-reflection film 1036.

Further, Japanese Patent Application Laid-Open No. 6(1994)-237016 discloses a method of fixing an optical fiber 1210 in a fiber guide hole 1209 etched in a substrate of a surface emitting laser 1203, as illustrated in FIG. 2. In FIG. 2, there are also illustrated an electronic circuit substrate 1201, a light-emitting chip 1202, a transistor 1204, transistor electrodes 1205, 1206 and 1207, an insulating layer 1208, and an adhesive 1211.

In those prior art methods, the number of components can be reduced, assemblage is very easy, and costs can be hence reduced. However, in the former prior art method (FIG. 1), it is difficult to control the distance between the optical fiber and the light-receiving or light-emitting portion, and there is a possibility of damaging the crystal upon impinging the optical fiber on the crystal and degrading the device. Therefore, in the latter prior art method (FIG. 2), the guide hole 1209 is tapered to decrease the diameter of its tip portion such that the optical fiber 1210 cannot be brought into contact with the crystal surface, and the substrate is not completely etched down to epitaxial layers such that a substrate portion slightly remains.

On the other hand, there has also been proposed a method of fixing a member for fixing an optical fiber directly to the surface of a substrate with surface optical devices. For example, Japanese Patent Application Laid-Open No. 11(1999)-307869 discloses a structure as illustrated in FIG. 3. In FIG. 3, protrusions 2022 and 2023 are formed on surface emitting lasers 2018, a member 2014 for fixing an optical fiber 2016 is fitted into the protrusions 2022 and 2023, and guide holes 2026 and 2027 are formed in the member 2014 at a position corresponding to a radiation portion of the laser 2018. In FIG. 3, there are also provided a module substrate 2012 and a hole 2024 for inserting the optical fiber 2016 therein.

In forming the fiber guide hole by etching, however, control of its tapering shape and hole diameter is Questionable, since its depth ordinarily reaches more than 100 μm. It is thus difficult to improve the yield. Further, where a portion of the substrate is left (FIG. 2), there occurs the problem that light is absorbed by this portion, and hence, usable wavelength of light is restricted.

When the block for fixing an optical fiber is used (FIG. 3), fabrication costs can not be necessarily lowered since the numbers of components and process steps increase, though the fabrication problems mentioned above can be solved.

Furthermore, an optical fiber is required to be positioned as closely as possible to a light-receiving device since light emerging from the end face of the optical fiber expands. It is, however, difficult to increase an incidence efficiency of light input into the light-receiving device. Similarly, it is hard to increase an optical coupling efficiency between light from a light-emitting device and an optical fiber, when a mismatch is large between radiation diameter and radiation angle of the light-emitting device and core diameter and reception angle of the optical fiber.

SUMMARY OF THE INVENTION

It is an object of the present invention to provide a surface optical device apparatus and an optical apparatus, in which the number of components can be decreased, a high fabrication control is not required, an alignment precision can be improved between a light-transmission member and a surface optical device, a fixing process of the light-transmission member can be facilitated such that yield can be improved and costs can be reduced, the distance between the surface optical device and the light-transmission member can be flexibly set, and ease and degree of freedom in implementation can be increased.

It is another object of the present invention to provide a surface optical device apparatus and an optical apparatus, in which an end portion of an optical fiber is shaped into a lens profile such that an optical coupling efficiency between the optical fiber and a light-emitting or light-receiving device can be improved, an insertion loss due to an optical interconnection module can be reduced, consumption power for driving the device can be lowered, productivity can be improved, and costs can be reduced.

It is yet another object of the present invention to provide a fabrication method of those structures, in which those structures can be readily mass-produced.

The present invention is generally directed to a surface optical device apparatus which includes a surface optical device capable of emitting or receiving light through a surface thereof, and a thick layer formed of a radiation-curable or electron-beam-curable material, such as a polymerizable resist. In the thick layer, a guide hole for inserting an end portion of a light-transmission member, such as an optical fiber, therein is formed at a position corresponding to the surface of the surface optical device such that the surface optical device can be optically coupled to the light-transmission member inserted in the guide hole. The guide hole is formed in the thick layer by performing a patterning on the thick layer using photolithography to selectively harden the thick layer and developing the thick layer.

The thickness of the thick layer is preferably in a range between 10 μm (this value is approximately equal to the core diameter of a silica-containing single-mode optical fiber) and 1000 μm (this value is approximately equal to the core diameter of a plastic optical fiber made of an acrylic material). More preferably, that thickness lies in a range between 50 μm and 500 μm. The size of the light-transmission member, such as an optical fiber, can be in a range between about 125 μm and about 1 mm. The thick layer is normally processed by photolithography, so that centers of the surface optical device and the guide hole can be precisely aligned with each other. Therefore, there is no need to perform special alignment and bonding of a guide-hole structure.

The diameter and shape of the guide hole can also be precisely controlled due to characteristics of the radiation-curable or electron-beam-curable material. The process of forming the guide hole is much easier than a process of etching a substrate to form a hole therein.

The surface optical device can be a surface light-emitting device, a surface light-receiving device, or the like. The device can be thinned by removing a growth substrate after devices of necessary chip size and number are implemented on an implement substrate. In this case, the implement substrate can be used as a handling substrate. The yield efficiency of gaining the surface optical devices from a wafer can be accordingly increased, and costs can be reduced.

A plurality of the surface optical devices can be arrayed, and a plurality of the guide holes can be arrayed corresponding to the arrayed surface optical devices. The surface optical device may be comprised of at least a surface light-emitting device only, at least a surface light-receiving device only, or a combination of at least a surface light-emitting device and at least a surface light-receiving device. Further, the surface light-emitting device may be a vertical cavity surface emitting laser (VCSEL), a surface emitting laser with only a functional layer including an active layer, a cavity layer and distributed Bragg reflector (DBR) mirror layers sandwiching the active layer, a thinned surface optical device without a growth substrate or with a thinned growth substrate, a surface optical device with a growth substrate left as it is, or a light emitting diode (LED).

The distance between the surface of the surface optical device and an end face of the light-transmission member can be flexibly controlled by the thick layer having a two-step structure as follows. Such a thick layer includes a lower layer with a hole whose size is smaller than a size of the light-transmission member and which transmits light therethrough, and an upper layer, formed on the lower layer, with a guide hole for fixing the light-transmission member therein, and the distance between the surface of the surface optical device and the end face of the light-transmission member is regulated by the thickness of the lower layer.

The shape of the guide hole can be freely set by appropriately designing a photo-mask used in forming the guide hole using photolithography. A way of escape for an adhesive can be formed, or the guide hole can be tapered such that the light-transmission member can be readily fitted into the guide hole. For example, the guide hole is contoured corresponding to an outer shape of the light-transmission member, or the guide hole consists of a portion contoured corresponding to an outer shape of the light-transmission member, and a groove connected to this portion.

The present invention is also directed to an optical apparatus which includes a substrate, a surface optical device arranged on the substrate, which is capable of emitting or receiving light through a surface of the surface optical device, a light-transmission member optically coupled to the surface optical device, and a thick layer formed of a radiation-curable or electron-beam-curable material, in which a guide hole for inserting an end portion of the light-transmission member therein is formed at a position corresponding to the surface of the surface optical device such that the surface optical device is optically coupled to the light-transmission member inserted in the guide hole. The guide hole is formed in the above-discussed manner.

An electronic device electrically connected to the surface optical device or another optical device can also be integrated on the substrate in a hybrid or mixed manner. The substrate can be made of a material which serves as a heat sink.

The light-transmission member may be an optical fiber, such as a polymer-containing plastic optical fiber or a silica-containing optical fiber. In this specification, the plastic optical fiber (POF) is an optical fiber whose core and/or cladding are made of polymers. The cladding may be clothed with a protective layer or a polymer jacket. The optical fiber may be a step-index (SI) type or a graded-index (GI) type.

In order to improve the optical coupling efficiency between the optical device and the optical fiber, an end portion of the optical fiber can be shaped into a lens portion, and a resin, air, or an inert gas such as nitrogen can fill a space between the end face of the optical fiber and the surface optical device. The resin may be a curable resin, such as an optical adhesive or a transparent resin. The curable resin is preferably a non-foamy synthetic-resin adhesive or a non-foamy transparent resin with a good transparency and small expansion and contraction coefficients. A thermosetting synthetic-resin adhesive is preferably a low-temperature hardening adhesive which does not induce softening of the plastic optical fiber. When the plastic optical fiber is a perfluorinated-polymer series plastic optical fiber or a polystyrene series plastic optical fiber, the hardening temperature of the resin is preferably lower than 70° C. When the plastic optical fiber is a polymethylmethacrylate (PMMA) series plastic optical fiber, the hardening temperature of the resin is preferably lower than 80° C. When the plastic optical fiber is a polycarbonate series plastic optical fiber, the hardening temperature of the resin is preferably lower than 125° C.

The lens-shaped end portion of the polymer-containing plastic optical fiber may be shaped into a concave portion, and the concave portion may be filled with a resin having a refractive index larger than a refractive index of the plastic optical fiber. Further, the lens-shaped end portion of the polymer-containing plastic optical fiber may be shaped into a convex portion, and a space between the convex portion and the surface optical device may be filled with a resin having a refractive index smaller than a refractive index of the plastic optical fiber. Where a space between the end face of the optical fiber and the surface optical device is filled with air or an inert gas, the lens-shaped end portion of the plastic optical fiber is shaped into a convex portion.

The lens-shaped end portion of the plastic optical fiber can be flexibly formed by pressing the end face of the optical fiber against a heated mold with an appropriate profile, such as a concave or convex shape and a spherical or aspherical shape. The diameter of the spherical or aspherical profile is preferably about equal to, or more than the core diameter of the plastic optical fiber.

The lens-shaped end portion of the plastic optical fiber can also be formed by immersing the end portion of the optical fiber in an appropriate organic solvent, which can dissolve the core or the cladding, and lifting the end portion from the organic solvent to dry it. The end portion can be shaped into a convex or concave-lens profile by controlling an immersion period, a lifting manner and the like.

When the optical fiber is an optical fiber with a low refractive index, for example, about 1.3 to 1.4, such as a perfluorinated-polymer series plastic optical fiber, a curable resin with a still lower refractive index must be selected in order to obtain the convex-lens effect with the filling curable resin. There is, however, almost no curable resin with such a low refractive index. Even if such a resin exists, an index difference between the resin and the plastic optical fiber is small, and hence, only a convex lens with an exceedingly weak refractive power can be achieved. In this invention, the end face of the plastic optical fiber is shaped into a concave shape, and a curable resin with a relatively large refractive index is put in the concave portion, so that the curable resin can function as a light-converging convex lens. In this case, since a central portion of the end face of the optical fiber is recessed, the end face of the optical fiber does not impinge on the surface optical device and the optical fiber can be readily implemented.

The present invention is further directed to an optical wiring apparatus in a form of an optical interconnection module for performing an optical interconnection between boards in electronic equipment. The apparatus includes the above-discussed optical apparatus, an electronic circuit for driving and controlling the surface optical device, which is integrated on the substrate and electrically connected to the surface optical device for driving, and a base member with an electric connection lead for electrically connecting the surface optical device and the electronic circuit to the board in the electronic equipment. The substrate is surface-implemented on the base member, and the electric connection lead is fixed to the base member and electrically connected to the surface optical device and the electronic circuit.

The present invention is further directed to an optical wiring apparatus in a form of an electric connector for performing an optical interconnection between electronic equipment. The apparatus includes the above-discussed optical apparatus, an electronic circuit for driving and controlling the surface optical device, which is integrated on the substrate and electrically connected to the surface optical device, and an electric connection pin for electrically connecting the surface optical device and the electronic circuit to the electronic equipment. The electric connection pin is electrically connected to the surface optical device and the electronic circuit and removably connectable to a receptacle in the electronic equipment.

Those optical wiring apparatuses constructed by integrating the above-discussed optical apparatus with the electronic circuit can be used as an optical interconnection unit with light-transmission and light-reception devices. A high-capacity, high-speed multi-channel transmission with a transmission speed of 1 Gbps per channel can be thereby achieved at a relatively low cost, while electromagnetic radiation noises are diminished.

The present invention is further directed to a method of fabricating a plurality of optical apparatuses in a collective manner. The method includes the steps of:

(a) forming functional layers of surface optical devices on a growth substrate;

(b) forming a plurality of sets of electric wiring patterns on a plurality of respective areas of an implement substrate;

(c) bonding at least a surface optical device, which is cut out of the growth substrate with the functional layers of the surface optical devices, to each respective area of the implement substrate;

(d) forming a thick layer of a radiation-curable or electron-beam-curable material with a guide hole on each surface optical device, using photolithography;

(e) implementing an electronic device and the like on each respective area of the implement substrate in a flip-chip manner;

(f) dicing the implement substrate such that the respective areas of the implement substrate are separated from each other; and (g) inserting a light-transmission member, such as an optical fiber, into each guide hole such that the surface optical device is optically coupled to the light-transmission member inserted in the guide hole.

These advantages, as well as others will be more readily understood in connection with the following detailed description of the preferred embodiments of the invention in connection with the drawings.

DESCRIPTION OF THE PREFERRED EMBODIMENTS

First Embodiment

Figure 1:
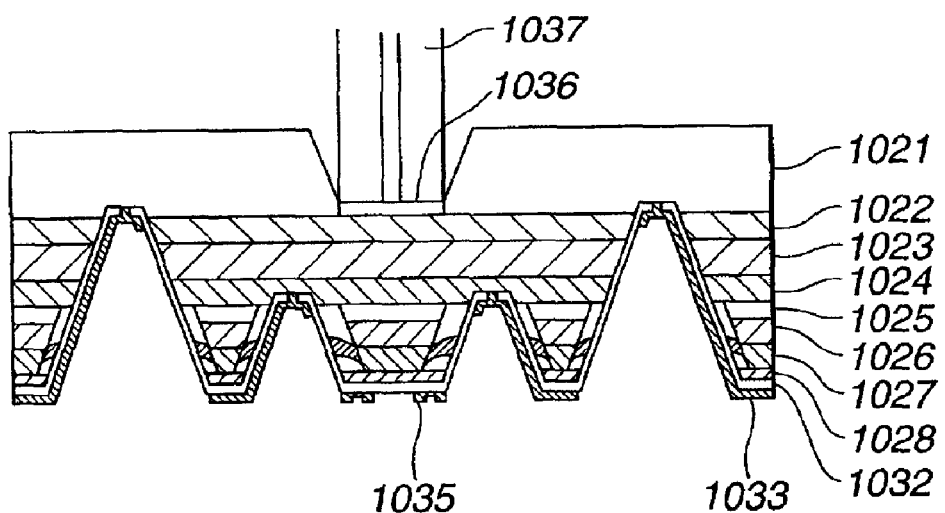
FIG. 1 is a cross-sectional view of a first prior art optical connection between a surface optical device and an optical fiber.
Figure 2:
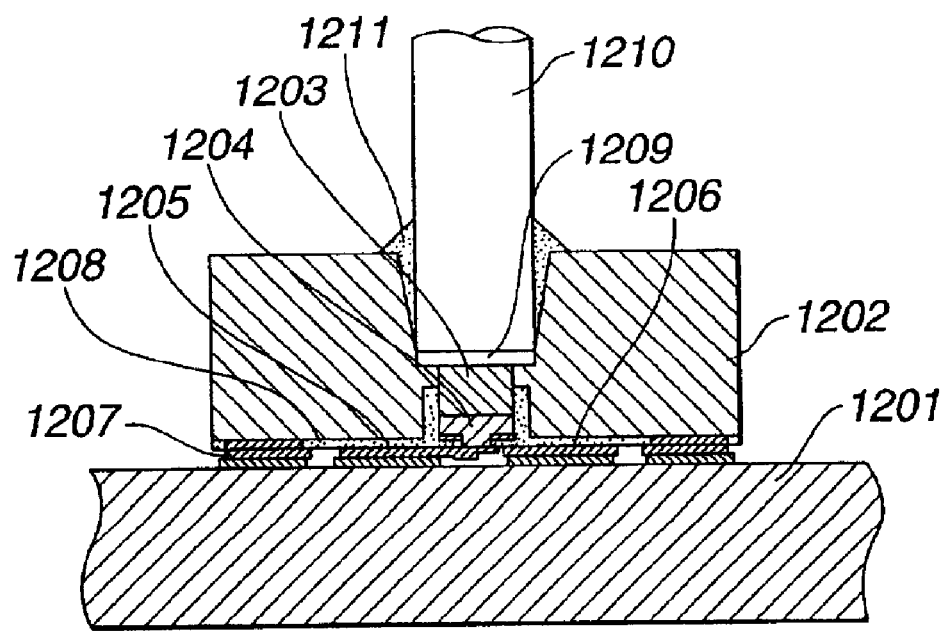
FIG. 2 is a cross-sectional view of a second prior art optical connection between a surface optical device and an optical fiber.
Figure 3:
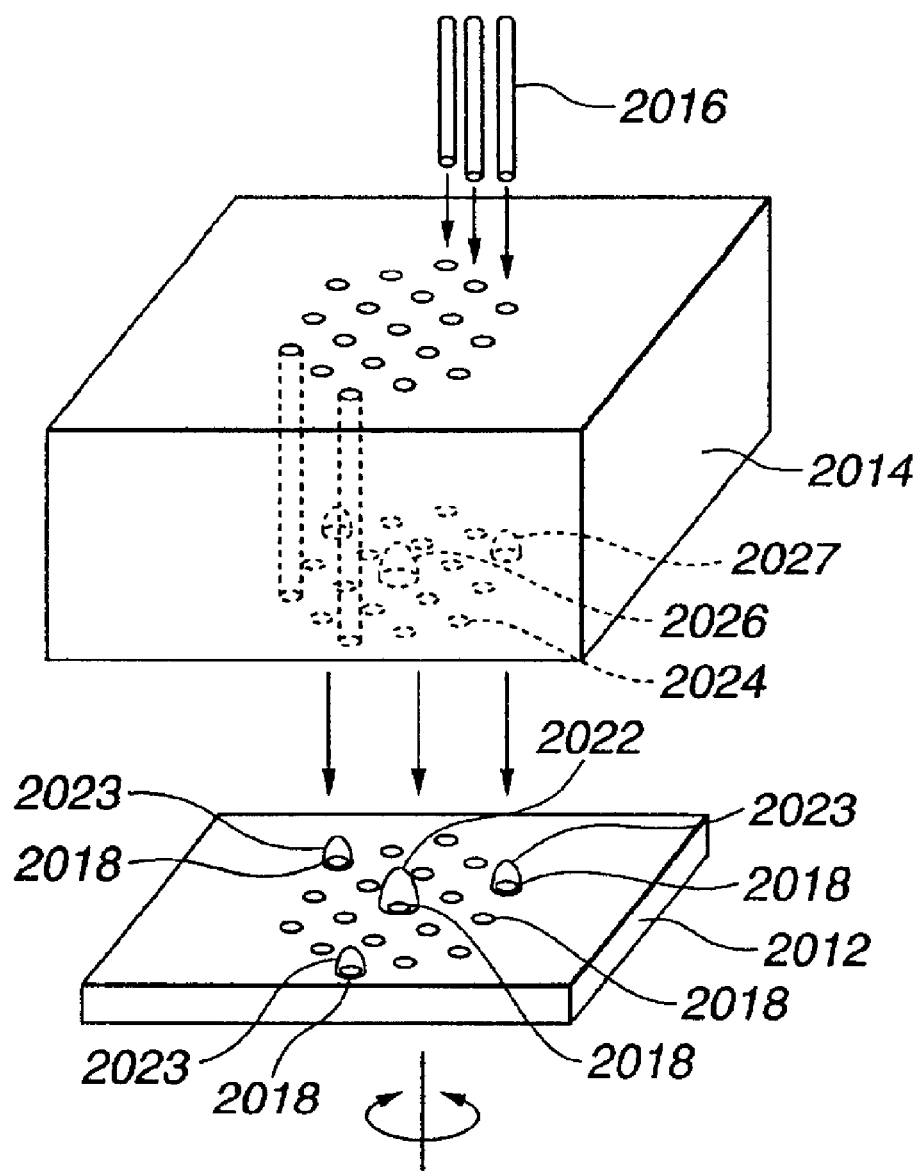
FIG. 3 is a cross-sectional view of a third prior art optical connection between a surface optical device and an optical fiber.
Figure 4:
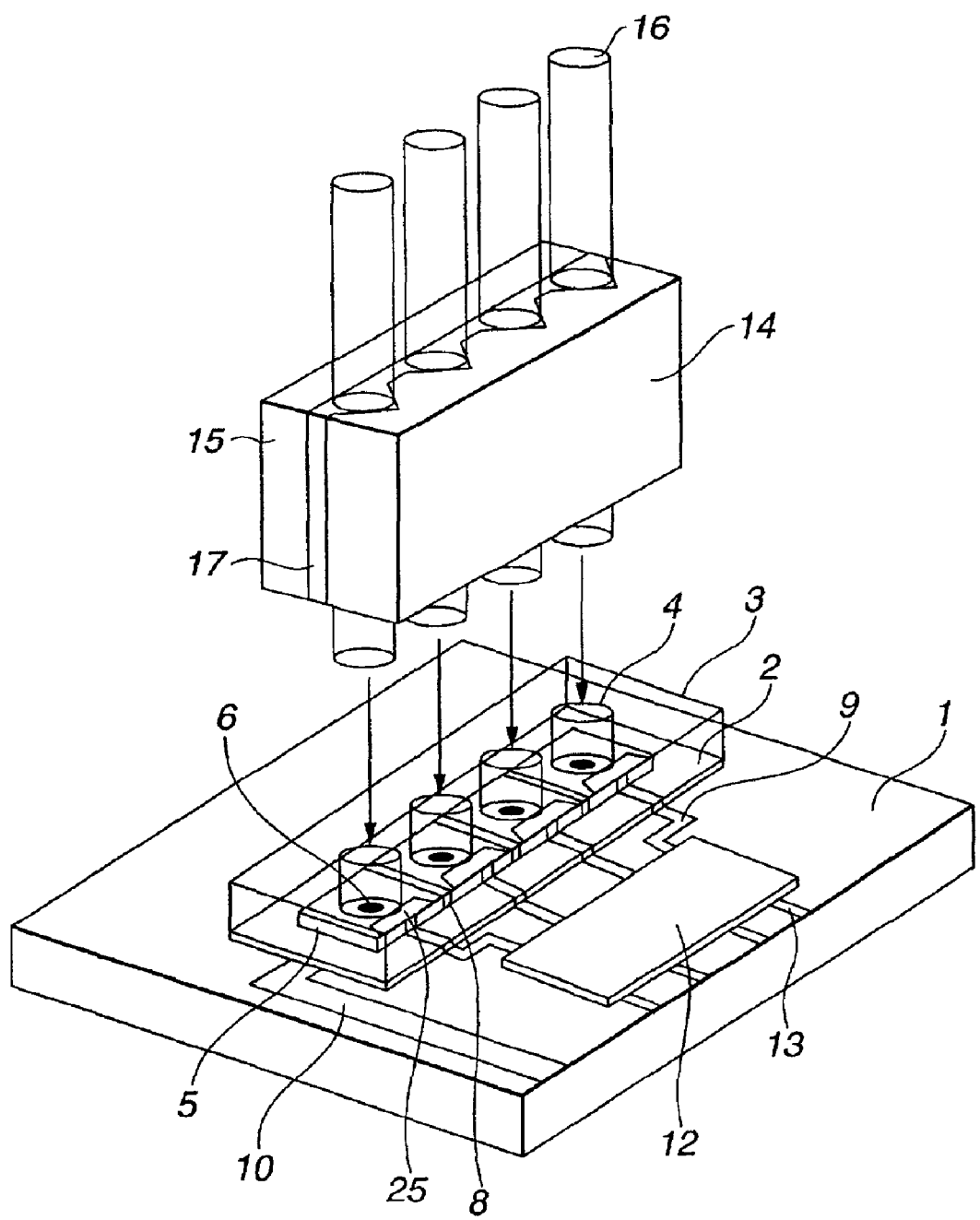
FIG. 4 is a partly-transparent perspective view illustrating a first embodiment of an optical device apparatus according to the present invention.

FIG. 4 illustrates a first embodiment of the present invention directed to an optical device apparatus. In the first embodiment, an array of four surface emitting lasers 5 are arranged with pitches of 750 μm and bonded on an implement substrate 1 through a common electrode 2. Grooves for separating the devices 5 from each other are designated by reference numeral 8, and portions corresponding to radiation points of the lasers 5 are designated by reference numeral 6. Electric wires for driving the surface emitting lasers 5 include an electric wire 10 for the common electrode 2 and electric wires 9 for independently driving the lasers 5, which are both formed on the substrate 1. Individual electrodes 25 for driving the lasers 5 are connected to the electric wires 9, respectively. A driver integrated circuit (IC) 12 for driving the lasers 5 is arranged on the common implement substrate 1 in a flip-chip manner. The driver IC 12 is connected to external electronic devices and the like via electric wires 13.

A plastic optical fiber (POF) 16 with a diameter of 500 μm is used as an optical fiber inserted into a fiber guide hole 4. The POFs 16 are sandwiched between a fixture jig 14 with V-shaped grooves and a flat jig 15, and secured with an adhesive 17. These jigs 14 and 15 are formed by plastic molding. Arrangement of pitches and central points of the POFs 16 is accomplished by those grooves. Tip portions of the POFs 16 project from a flat face contoured by the jigs 14 and 15, as illustrated in FIG. 4. The protrusion amount is set to 500 μm in this embodiment. Four POFs 16 are commonly cut by a knife or the like after being fixed between the jigs 14 and 15, and their end faces are flattened by an abrasive. The end faces of the POFs 16 can also be flattened by pressing these end faces against a heated flat plane. Alternatively, their end faces may be shaped into an appropriately-curved face such that light reflection thereat can be prevented and a lens function can be created.

An optical fiber basically formed of perfluorinated-polymers (trade name: Lucina of Asahi Glass Com. Ltd.), which can transmit light up to a 1.3 μm-band, is used as the POF 16 of this embodiment. Other materials, such as heavy hydride polymers and ultraviolet (UV) radiation curable resin, can also be used for the POF 16. Further, such an optical fiber, which has a silica core or which is entirely formed of silica, can also be used. The diameter of the guide hole 4 and the shape of the V groove in the fixture jig 14 can be appropriately designed, considering the diameter of the optical fiber 16.

The guide hole 4 for guiding the optical fiber 16 therein is formed in a thick photo-resist layer 3 such that a center of the radiation point 6 of the surface emitting laser 5 coincides with a core center of the optical fiber 16 inserted in the fiber guide hole 4, as illustrated in FIG. 4 which is a perspective view partly transparent at the photo-resist layer 3. In this embodiment, in order to form the thick resist layer 3, a photo-resist is deposited directly on the substrate 1 by a spin-coating apparatus or the like, a desired pattern is formed in the photo-resist by photolithography using a photo-mask, and development is performed to form the guide holes 4. In the pattern alignment, the center of the radiation point 6 can be made coincident with the center of the guide hole 4 with a positional precision of less than several microns by forming, on the photo-mask, a mark for alignment with the electrode 25 formed on the laser In the first embodiment, the thick resist layer 3 is formed of SU8-50 of MicroChem Corp. This material is spin-coated up to a thickness of 200 μm and pre-baked at 90° C. on a hot plate. Exposure is performed by an exposure apparatus, with an outer frame size of 3 mm×1 mm and a pattern of circles with a pitch of 750 μm and a diameter of 520 μm while the above pattern alignment is conducted using the photo-mask. Then, after-exposure baking is performed at 90° C. on the hot plate again, the resist is developed with a developer. After the development, rinsing is conducted with isopropyl alcohol, and baking is conducted at 90° C. in an oven to completely evaporate a solvent. Thus, a process of forming the thick resist layer 3 is conducted at a relatively low temperature. Accordingly, the fiber guide hole 4 can be formed without damaging the optical device 5, electric contacts and so forth. In this embodiment, SU8 is used to form the thick resist layer 3, but material of the thick resist layer 3 is not limited thereto.

After an adhesive is put in the guide holes 4, the POFs 16 fixed with the fixture jig 14 and 15 are inserted into the guide holes 4 to achieve the optical coupling. As the adhesive, thermosetting or UV radiation curable optical adhesive is used. Its refractive index is made close to that of the POF 16. Material with a refractive index different from that of the POF 16 can be used when a lens function is to be created on the end face of the optical fiber 16. On a light emitting surface of the surface emitting laser 5, an anti-reflection coating (not shown) of $SiO_x$ or the like for reducing light reflection thereat may also be provided.

Figure 7:
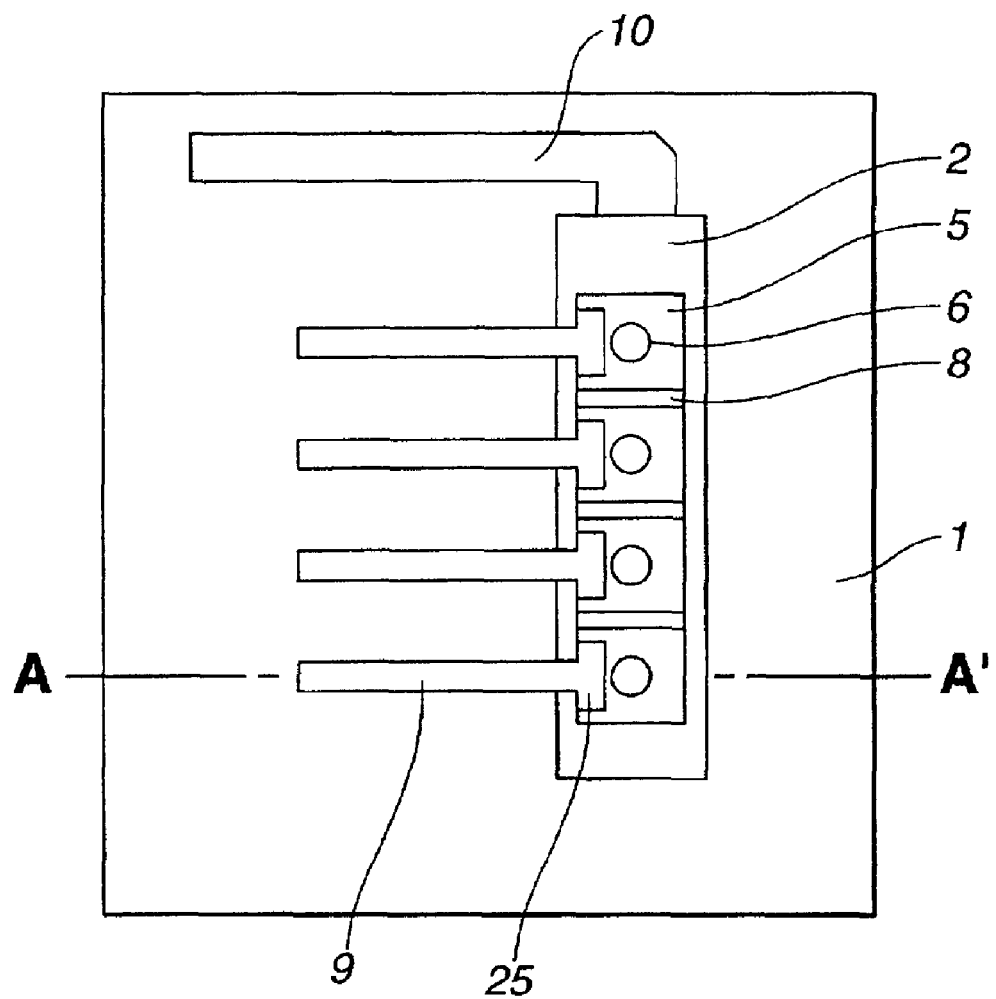
FIG. 7 is a plan view illustrating an electric wiring of the first embodiment.

A coupling portion between the surface emitting laser 5 and the POF 16 will be described by reference to FIG. 5 which is an A–A' cross-sectional view of FIG. 7 and illustrates a single device.

In this embodiment, a growth substrate of the surface emitting laser 5 is removed and only its functional layer is transferred on the implement substrate 1 to construct a thinned structure, such that the thick resist layer 3 can be provided on the laser 5. The functional layer of the laser 5 includes a one-wavelength cavity 23 containing an active layer, and p-type and n-type distributed Bragg reflector (DBR) mirrors 22 and 24 comprised of AlGaAs alternate multiple layers and sandwiching the cavity The functional layer of the laser 5 has a thickness of about 7 $\mu$m. An air post 28 for confining an injection current is formed in a cylindrical form with a diameter of 15 $\mu$m on the side of the p-type DBR mirror 22. Surroundings of the air post 28 are filled with polyimide 27, and the end surface of the laser 5 is thus flattened. An $Al_xO_y$ layer 29 is formed near the active layer. The $Al_xO_y$ layer 29 is formed by selectively water-vapor-oxidizing an AlGaAs layer with an Al mole fraction of more than 0.95 only in a lateral direction. An aperture size of a current injection region in the $Al_xO_y$ layer 29 is set to about 3 $\mu$m$\phi$, and an oscillation threshold is hence set less than 1 mA.

A common electrode 20 is formed on the side of the p-type DBR mirror 22, and the electrode 20 is bonded on the common electrode pad 2 formed on the substrate 1, with an AuSn solder or the like. The bonding can also be achieved by pressure joint between Au and Au. The n-side electrode 25 is formed on a surface of the n-type DBR mirror 24 exposed by removing the GaAs substrate (not shown), such that a current can be independently injected into each device. An insulating layer 26 is formed on that exposed surface, and a light-output portion 31 and a contact hole 32 are formed in the insulating layer 26. The electric wire 9 formed on the substrate 1 is connected to the n-side electrode 25 through the contact hole 32. The side of the surface emitting laser 5 and the p-side common electrode pad 2 must be covered with the insulating layer 26 since the electric wire 9 is also formed on the side wall of the laser 5. A photosensitive polyimide, such as PIMEL (trade name) produced by Asahi Kasei Kabushiki Kaisha, is preferably used as the insulating layer 26. Its thickness is 1 $\mu$m in this embodiment. In FIG. 5 also, reference numeral 4 designates a guide hole, and reference numeral 21 designates an insulating layer.

Figure 5:
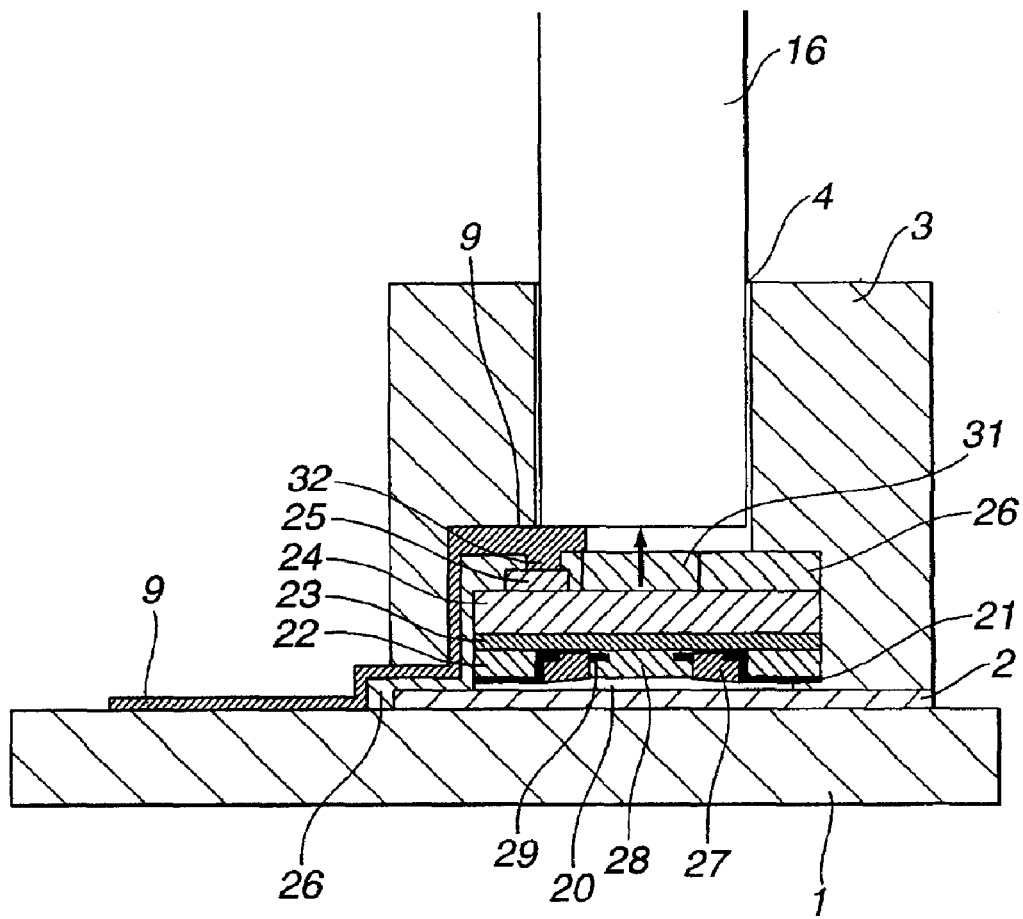
FIG. 5 is a cross-sectional view of the first embodiment.

The POF 16 is fixed at a position where its end face abuts on the surface of the device 5 (the electric wire 9 on the electrode 25 in this example), as illustrated in FIG. 5. Therefore, the POF 16 does not impinge on the crystal surface of the surface emitting laser 5, and hence, the laser 5 is not damaged.

On the other hand, heat generated in the surface emitting laser 5 is radiated to the substrate 1 through the common electrode pad 2. Accordingly, material of the implement substrate 1 is preferably AlN, or Si on the surface of which an insulating thin film, such as $Al_2O_3$, is formed.

The fabrication process of the thin surface emitting laser 5 used in the first embodiment will be described by reference to FIGS. 6A to 6D. Here, only two devices are illustrated for the sake of simplicity.

Figure 6A:
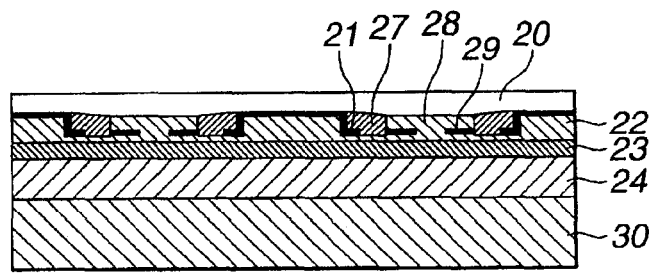
FIGS. 6A to 6D are cross-sectional views illustrating a method of fabricating the first embodiment.

As illustrated in FIG. 6A, the n-type DBR mirror 24, the one-wavelength cavity 23 of AlGaAs containing an active layer consisting of three quantum wells of GaAs/AlGaAs, the p-type DBR mirror 22, and a p-GaAs contact layer (not shown) are grown on an n-GaAs substrate 30, using metal organic chemical vapor deposition (MOCVD) or the like. The air post 28 is formed by reactive etching using a $Cl_2$ gas, and the above-mentioned selective oxidized layer 29 is formed by oxidization using a water vapor. After that, an insulating layer 21 of $SiN_x$ is formed, and the surface is flattened by the polyimide 27. The common electrode 20 is then deposited. Ti/Au is used as the common electrode 20, for example.

Figure 6B:
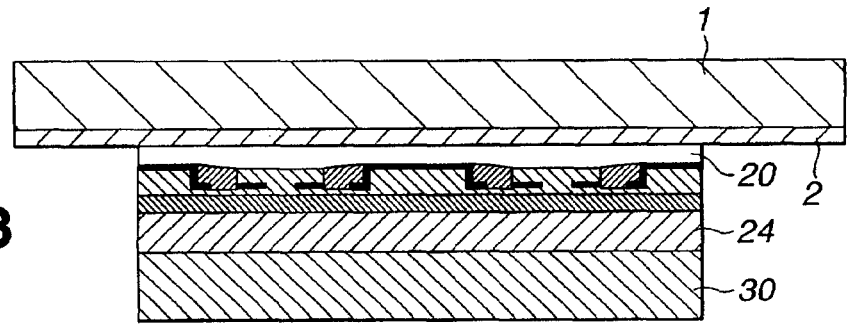

As illustrated in FIG. 6B, after the substrate 30 is abraded to a thickness of about 100 $\mu$m, the device on the wafer fabricated by the process of FIG. 6A is cut into an appropriate size. The thus-cut device is bonded on the common electrode pad 2 formed on the implement substrate 1, using pressure joint between Au and Au (it may be assisted by ultrasonic waves) or an AuSn solder. Here, the electrode pad 2 is formed of Ti/Pt/Au whose top surface is Au.

Figure 6C:
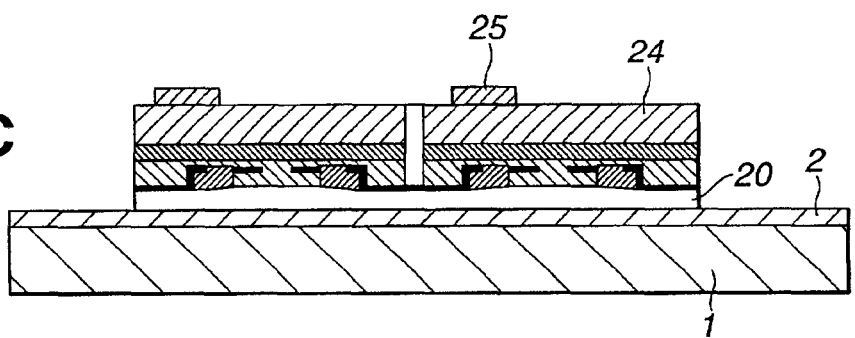

As illustrated in FIG. 6C, the GaAs substrate 30 is etched with a liquid mixture of $H_2O_2$ and $NH_3$, and the etching is stopped at the first layer of AlAs of the n-DBR mirror 24. Thereafter, the individual electrodes 25 are formed on the n-GaAs layer which is exposed by removal of AlAs using HCl. AuGe/Ni/Au can be used as the individual electrodes 25, for example. Annealing is then performed at 380° C. to establish an electrode contact.

Figure 6D:
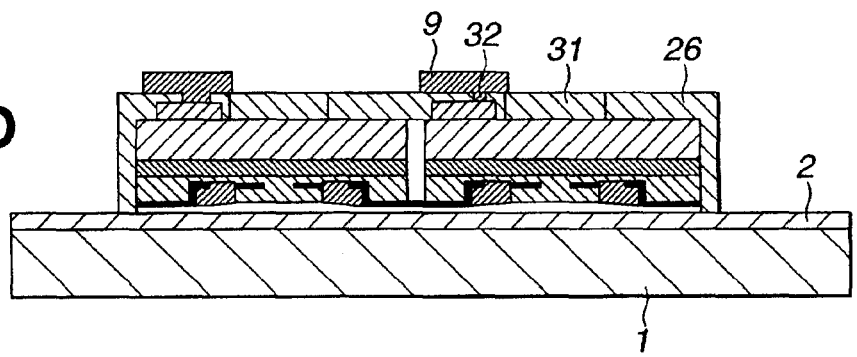

As illustrated in FIG. 6D, the entire surface is coated with the photosensitive polyimide 26, and the hole 32 for electrode contact and the light-output window 31 are formed in the polyimide 26. The electric wire 9 of Ti/Au or the like is then formed, using a lift-off method or the like. Thus, the thin surface emitting laser 5 is fabricated on the implement substrate 1, as illustrated in FIG. 7. In FIG. 7 also, reference numeral 6 designates a radiation point of the laser 5, reference numeral 8 designates a groove for separating the lasers 5, and reference numeral 10 designates an electric wire for the common electrode 2.

Figure 8:
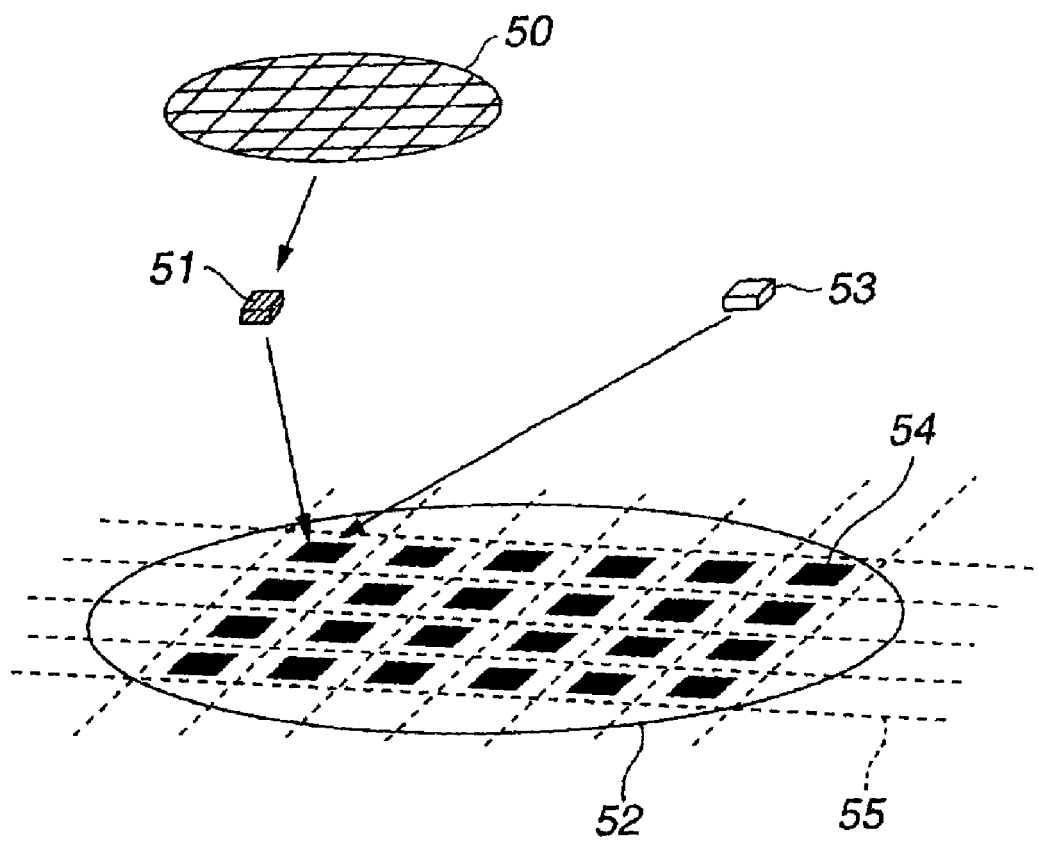
FIG. 8 is a perspective view illustrating a method of fabricating an optical device apparatus according to the present invention.

In the above-discussed fabrication process, fabrication steps for a single chip are described, but actually a collective process on a wafer level is desirable to improve the productivity. FIG. 8 illustrates such a collective processing manner. In the process of FIG. 8, a laser chip 51 with a necessary size (a 1×4 arrangement in the first embodiment) is cut from a GaAs wafer 50 on which a plurality of surface emitting lasers are formed, and the laser chip 51 is bonded to an Si wafer 52 on which $Al_2O_3$ layers and electrode pads 2 are formed in a plurality of regions 54. During this process, laser chips 51 are consecutively bonded to the predetermined regions 54 of the wafer 52 by a flip-chip bonding apparatus, while being aligned. The thin-film process of the laser 5, the wiring process, and the process of forming the fiber guide holes 4 in the thick resist layer 3 are then conducted in a collective manner by photolithography and etching.

After that, each Si-IC 53 for driving the laser 5 is bonded to the wafer 52 by a flip-chip bonding apparatus. Finally, the wafer 52 is diced into individual chips along dotted lines 55 of FIG. 8 to obtain a plurality of chips at a time.

In the above structure, the number of arrayed lasers 5 and optical fibers 16 is four, but more than or less than four of the array number is possible. Further, the above structure is also applicable to a surface light-receiving device.

In an optical apparatus as discussed in the foregoing, only the surface emitting laser may be integrated on a light transmission side, or only the surface light-receiving device may be integrated on a light reception side, or both the surface light-emitting device and the light-receiving device may be integrated. In the case where the surface light-emitting device and the light-receiving device are separately provided, one-directional transmission can be achieved. In contrast, where both the surface light-emitting device and the light-receiving device are provided in an optical module, two-directional transmission can be attained.

Second Embodiment

Figure 9:
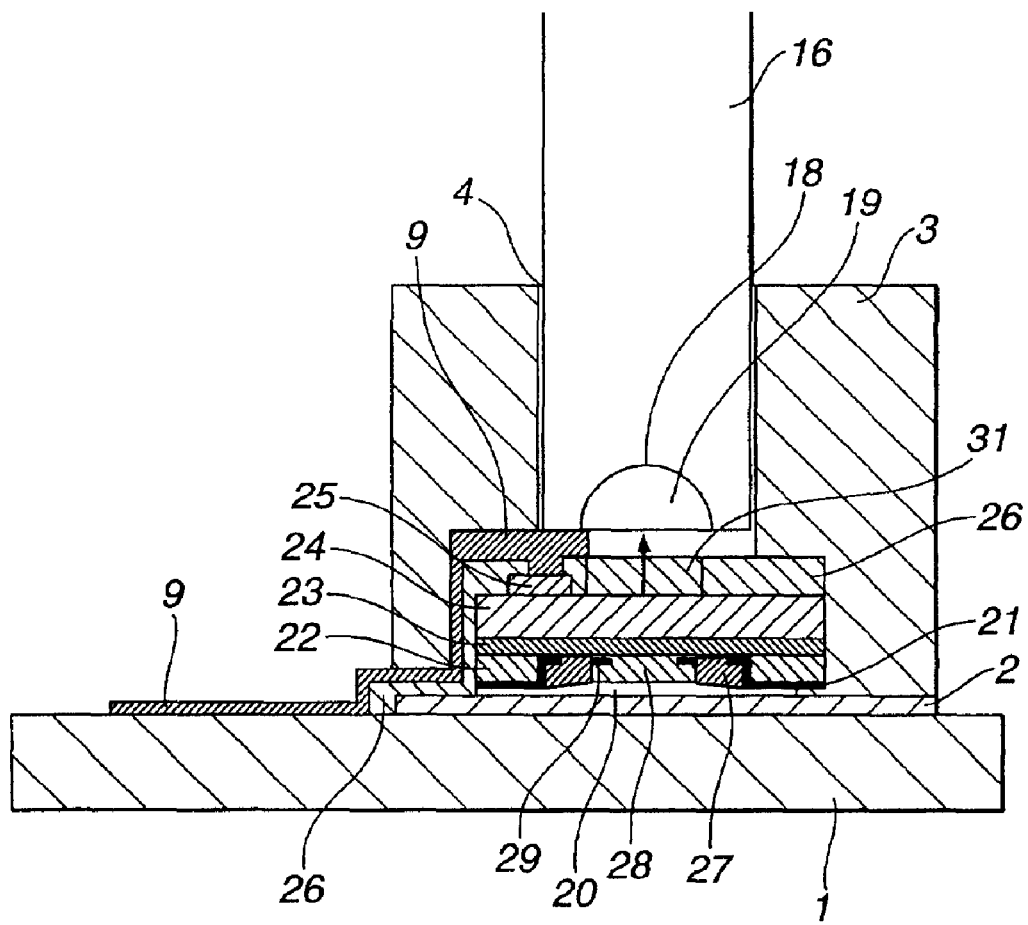
FIG. 9 is a cross-sectional view illustrating a second embodiment of an optical device apparatus according to the present invention.

FIG. 9 illustrates a second embodiment of the present invention directed to an optical device apparatus. The second embodiment is different from the first embodiment only in that an optical fiber with a lens portion is used in the second embodiment. In FIG. 9, the same portions as those in FIG. 5 are designated by the same reference numerals.

A plastic optical fiber (POF) 16 of a perfluorinated-polymer series with a diameter of 500 µm is used as the optical fiber inserted into the fiber guide hole 4. The POFs 16 are sandwiched between the fixture jig 14 with V-shaped grooves and the flat jig 15. Four POFs 16 are commonly cut by a knife or the like after being fixed between the jigs 14 and 15, and their end faces are pressed against a heated convex mold to form a spherical concave structure 18 on the end face. The spherical concave structure 18 has a diameter larger than a core diameter but smaller than a fiber diameter, so that a flat end portion remains around the spherical concave structure 18.

The spherical concave structure 18 is filled with a curable resin 19 which has a refractive index larger than that of the POF 16. The refractive index of the curable resin 19 lies in a range from about 1.4 to about 1.7. An optical fiber formed of perfluorinated-polymer series (for example, Lucina of Asahi Glass Com. Ltd.) has a refractive index of about 1.35, and an optical fiber formed of polymethylmethacrylate (PMMA) series has a refractive index of about 1.49. An index difference (typically from about 0.2 to about 0.3) between the POF 16 and the curable resin 19 is large enough to obtain a light-converging function. The curable resin 19 may be a room-temperature curable type, a thermosetting type, or radiation curable type, but in this embodiment the room-temperature type is used since a softening temperature of the perfluorinated-polymer series optical fiber is relatively low. Naturally, such a curable resin with a curing temperature lower than the softening temperature of the POF 16 can be used. Further, if the thick resin layer 3 has an UV radiation transmitting property, a radiation curable resin can also be used. A non-curable resin can also be used, if the index difference between this resin and the POF is appropriate and this resin is optically stable.

As for a material of the POF 16, other materials, such as PMMA, polycarbonate, polystyrene, heavy hydride polymer, and ultraviolet (UV) radiation curable resin, can also be used.

The end portion of the POF 16 can have a function of a convex lens, and the POF 16 can be optically coupled to the optical device readily, when the POF 16 fixed between the jigs 14 and 15 is inserted in the fiber guide hole 4 after the curable resin 19 is put in the guide hole 4.

The POF 16 is fixed at a position whereat its end flat portion around the concave structure 18 abuts on the surface of the device 5 (the electric wire 9 on the electrode 25 in this example), as illustrated in FIG. 9. Therefore, the concave structure 18 of the POF 16 does not impinge on the crystal surface of the surface emitting laser 5, and hence, the laser 5 is not damaged.

Third Embodiment

A third embodiment of the present invention is directed to an optical apparatus in which an ordinary surface emitting laser fabricated on a GaAs substrate, not a thinned surface emitting laser without a GaAs substrate, is used. The cross-sectional structure of the laser used in this embodiment is approximately the same as that illustrated in FIG. 6A. The third embodiment is different from the first embodiment in a light-output window formed in a p-side electrode and a position where electrodes of the devices are separated from each other.

Figure 10:
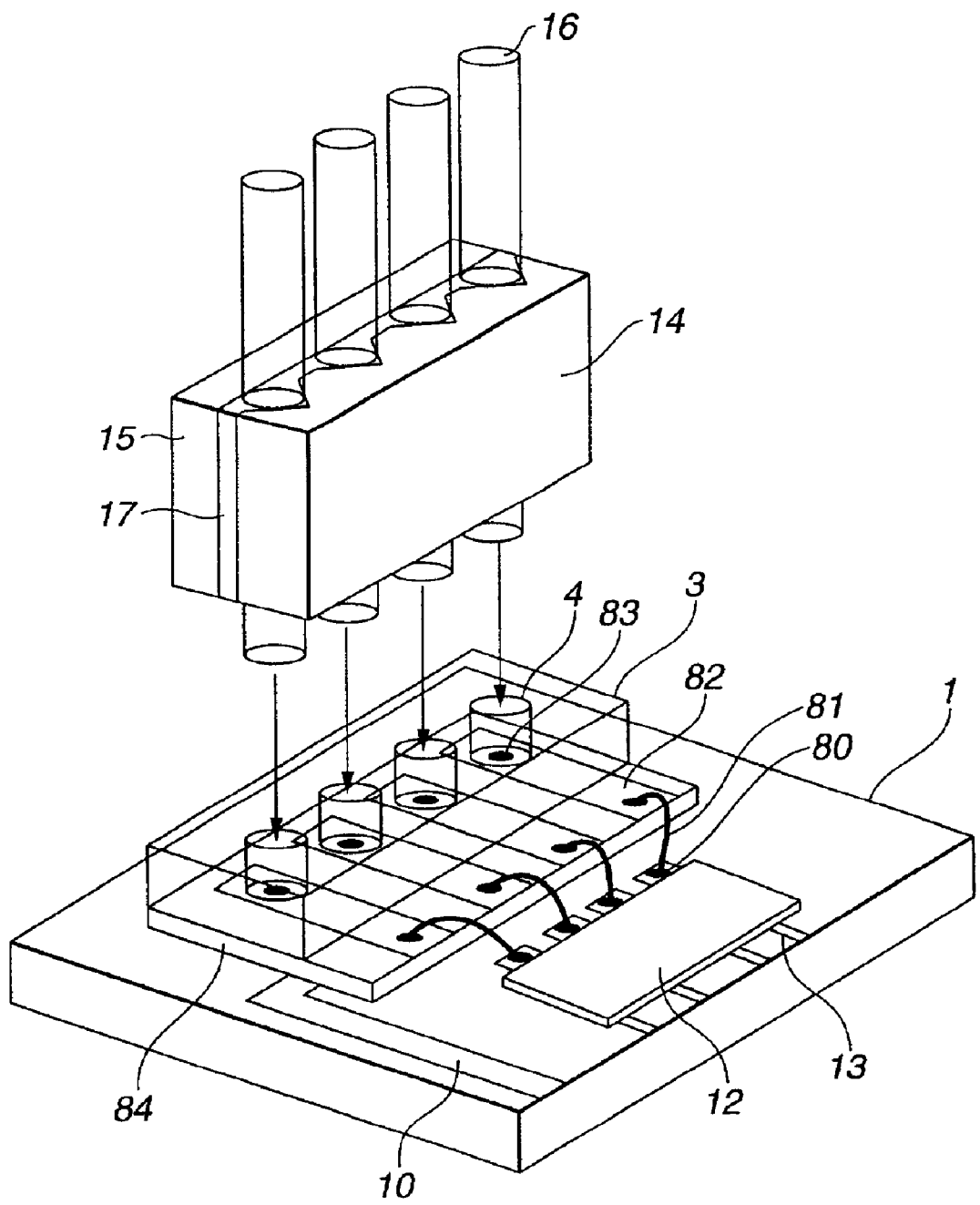
FIG. 10 is a partly-transparent perspective view illustrating a third embodiment of an optical device apparatus according to the present invention.

FIG. 10 illustrates the third embodiment. The structure is approximately the same as that illustrated in FIG. 4, with exceptions that the diced size of a surface emitting laser 84 is increased and that an electric wiring 81 between the laser 84 and the IC 12 is established by a wire bonding. The same portions as those of the first embodiment are designated by the same reference numerals.

On a surface of the surface emitting laser 84 fabricated on the GaAs substrate, Ti/Au of the p-side electrode 82 and electric wiring is formed on the insulating layer. The light-output window is formed at a location of the p-side electrode 82 corresponding to a light-emitting point 83. The wire bonding 81 is bridged between an electric pad 80 on the substrate 1 electrically connected to the IC 12 and the p-side electrode 82. This wire bonding can be replaced by a flexible wiring board.

The thick resist layer 3 for forming the fiber guide hole 4 therein is collectively formed on the surface after the surface emitting laser 84 and the p-side electrode 82 are formed on the GaAs substrate, prior to the dicing of the wafer into chips. Accordingly, no processes, such as photolithography, are performed after the laser chip 84 is implemented on the implement substrate 1. Only surface implementation by collective re-flow (heating of a solder) and electric wiring by wire bonding and the like are performed.

In the third embodiment, the size of the chip diced from the GaAs wafer is larger than that of the first embodiment. Hence, the number of lasers obtained from the laser wafer decreases. Further, the driving speed of a cathode-common type employed in the third embodiment is smaller than that of an anode-common type employed in the first embodiment. On the other hand, the number of the processing steps decreases, and hence, the fabrication cost can be reduced and the yield can be improved. The third embodiment with a relatively small number of arrayed devices is suitable for use in an optical transmission with a transmission speed of about 622 Mbps.

Fourth Embodiment

Figure 11:
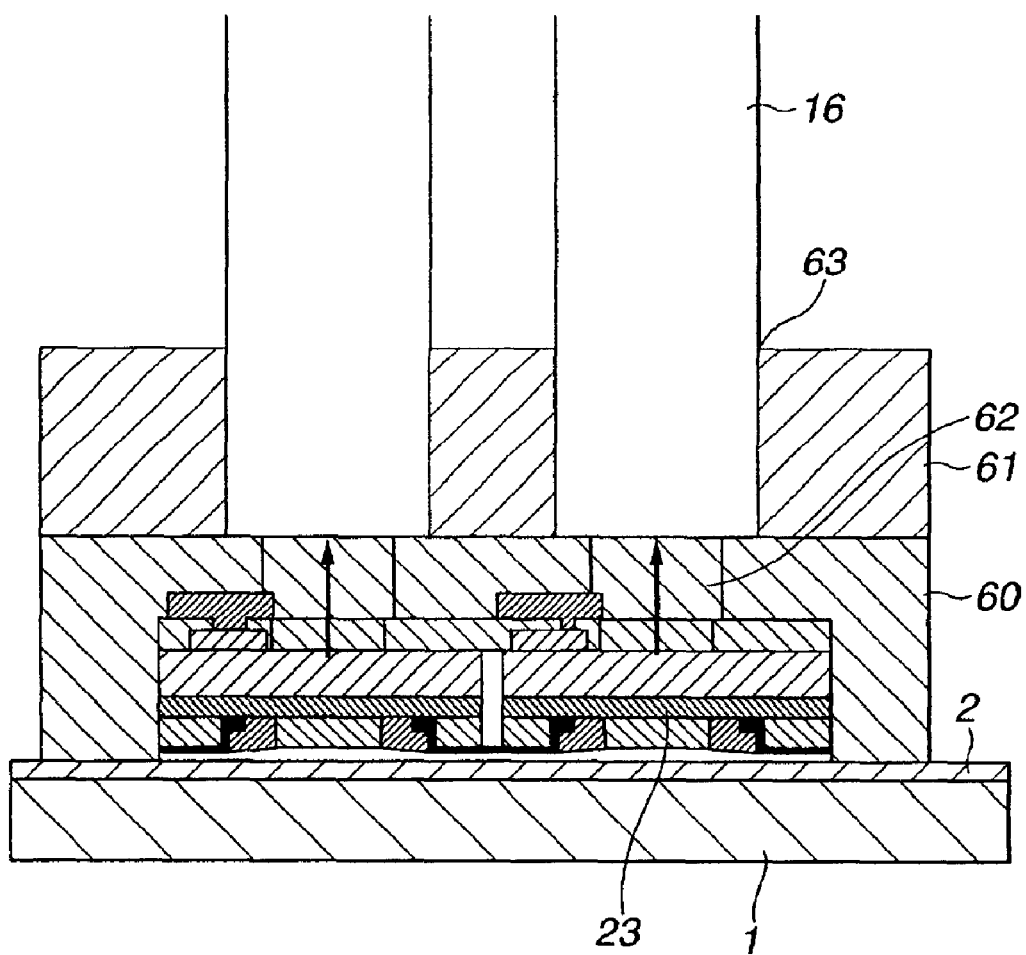
FIG. 11 is a cross-sectional view illustrating a fourth embodiment of an optical device apparatus according to the present invention.

A fourth embodiment of the present invention is directed to an optical apparatus in which a thick resist layer has a two-step structure such that the distance between the emitting surface of the surface emitting laser and the end face of the optical fiber can be appropriately regulated. FIG. 11 illustrates the fourth embodiment. The same portions as those of the first embodiment are designated by the same reference numerals.

In the two-step resist layer, a fiber guide hole 63 is formed in an upper thick resist layer 61, and a hole 62 with a diameter of 300 µm smaller than the diameter of the optical fiber 16 is formed in a lower thick resist layer 60. Such a two-step resist layer can be constructed by twice repeating resist-patterning processes similar to that employed in the first embodiment. In this embodiment, each of the upper and lower thick resist layers 61 and 60 has a thickness of 200 µm. Owing to this structure, when the optical fiber 16 is inserted into the guide hole 63 and its end face is caused to abut on a step portion, the end face of the optical fiber 16 is prevented from impinging on and damaging the optical device. Further, the structure makes it possible to put a lens, such as a ball lens, in the hole 62 of the lower resist layer 60 such that light from the optical fiber 16 or the optical device can be converged. This is especially effective in an optical coupling between the light-receiving device and the optical fiber 16.

Furthermore, the distance between the emitting surface of the surface emitting laser and the end face of the optical fiber 16 can be freely set by controlling the thickness of the lower thick resist layer 60.

Fifth Embodiment

Figure 12:
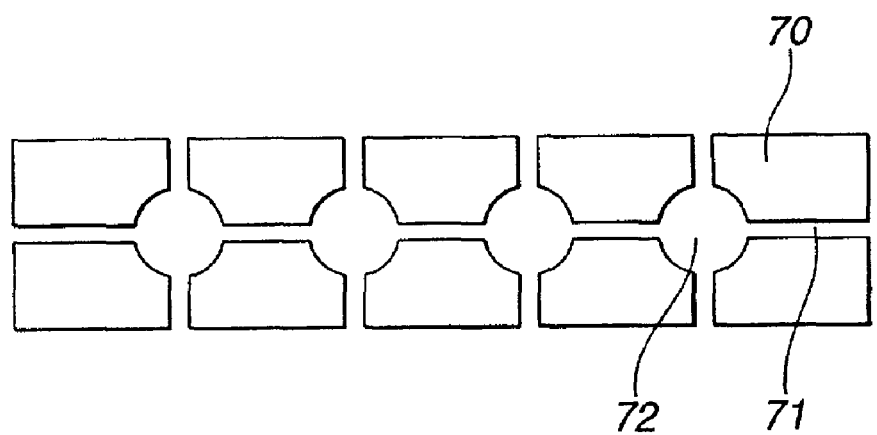
FIG. 12 is a plan view illustrating a pattern of fiber guide holes in a fifth embodiment of an optical device apparatus according to the present invention.

FIG. 12 illustrates a flat pattern of a thick resist layer 70 in a fifth embodiment. In this pattern, grooves 71 are formed in addition to fiber guide holes 72 for fixing the optical fiber. The groove 71 has technical advantages as follows: The thick resist layer 70 can be rapidly developed when it is formed. A stress between the resist layer 70 and its underlaid layer can be moderated. The groove 71 acts as a way of escape for an adhesive when the optical fiber is fixed by the adhesive. The optical fiber can be readily fitted into the fiber guide hole 72.

As discussed above, when the fiber guide hole is formed using a thick resist, the pattern of the hole can be freely designed by changing the pattern of a photo-mask for selectively exposing the thick resist to light. Therefore, optical fibers with different diameters, such as 1 mm, 500 $\mu$m and 250 $\mu$m, can be integrated in a unit, or even a rectangular groove for fixing a light waveguide film or the like can be formed, for example.

Sixth Embodiment

Figure 13:
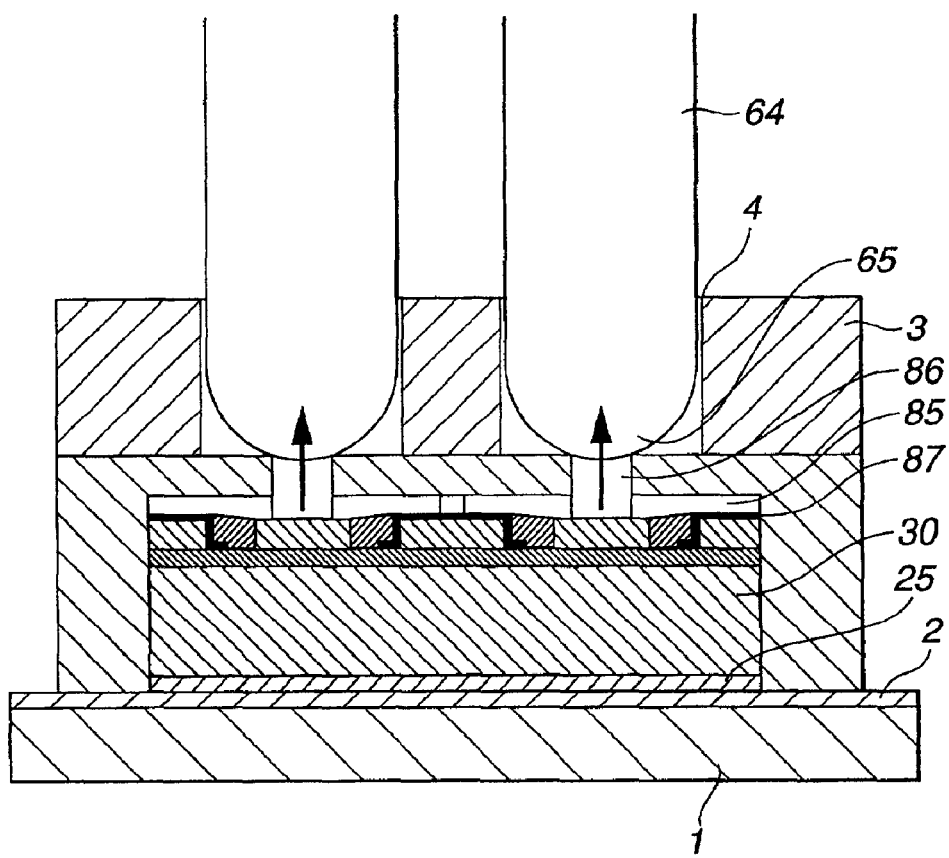
FIG. 13 is across-sectional view illustrating a sixth embodiment of an optical device apparatus according to the present invention.

FIG. 13 illustrates a sixth embodiment of the present invention directed to an optical device apparatus. The sixth embodiment is different from the third embodiment only in that an optical fiber 64 with a convex lens portion 65, a thick resist layer 3 with a two-step guide hole 4, and a light emitting diode (LED) 87 are used in the sixth embodiment.

The plastic optical fiber (POF) 64 formed of PMMA is used as the optical fiber inserted into the fiber guide hole 4 in the thick resist layer 3. The end face of the POF 64 is pressed against a heated concave mold, and shaped into the convex lens portion 65. The convex lens portion 65 is caused to abut on a step portion in the fiber guide hole 4 such that a top portion of the convex lens portion 65 is not brought into contact with the LED 87. The POF 64 is fixed in the guide hole 4 with a UV radiation curable type adhesive. A space in the guide hole 4 around the convex lens portion 65 is filled with air, an inert gas such as nitrogen, or an adhesive. Where the adhesive is used, it should have a refractive index lower than that of the POF 64.

The LED 87 is a red-color light emitting diode with a radiation wavelength of 650 nm, which is formed on the GaAs substrate. Ti/Au of the p-side electrode 85 and electric wiring is formed on the insulating layer formed on the LED 87. A light-output window 86 is formed at a position of the p-side electrode 85 corresponding to the radiation point. In FIG. 13 also, reference numeral 25 designates an electrode, and reference numeral 30 designates a substrate.

In this embodiment, a driving speed of the LED 87 is lower than that of a surface emitting laser. On the other hand, the structure of this embodiment can be fabricated by a smaller number of processing steps, so that costs can be reduced and yield can be improved. The sixth embodiment with a relatively small number of arrayed devices is suitable for use in an optical transmission with a transmission speed in a range between about 100 Mbps and about 200 Mbps.

Seventh Embodiment

Figure 14:
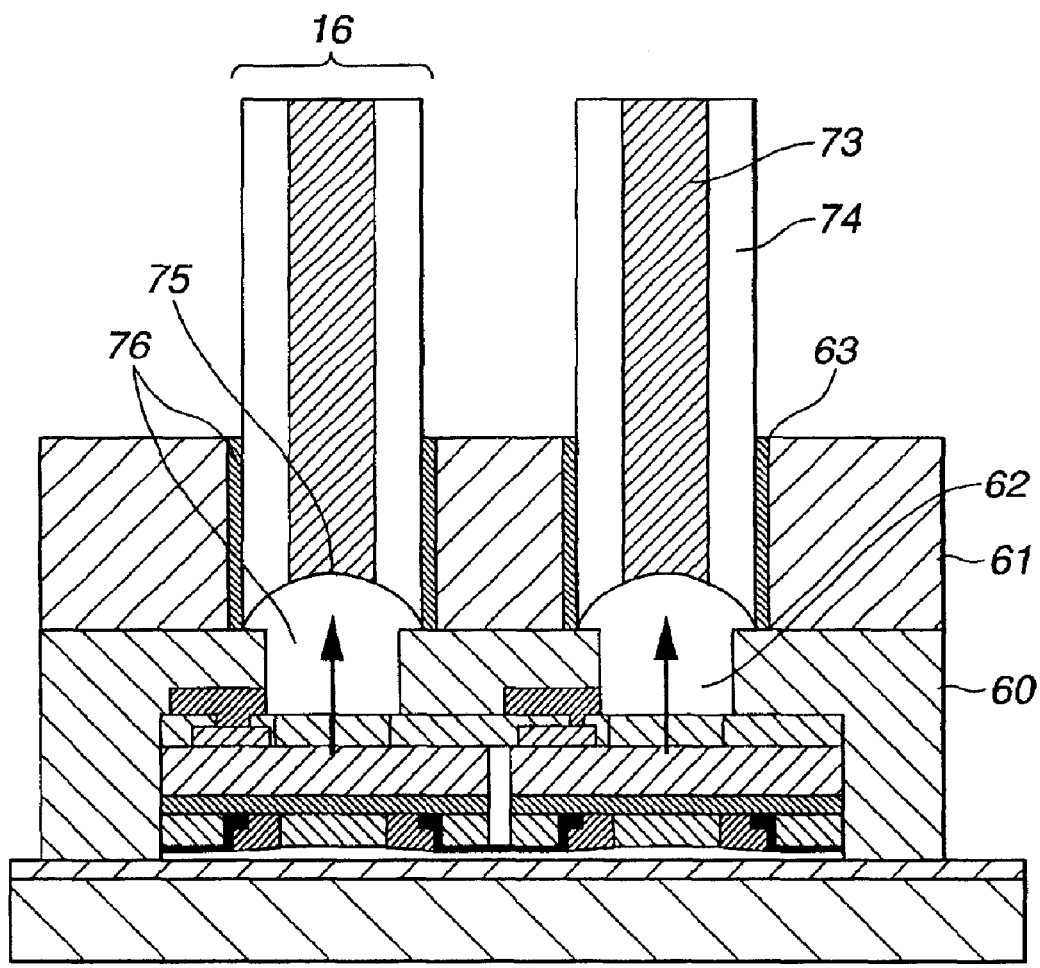
FIG. 14 is a cross-sectional view illustrating a seventh embodiment of an optical device apparatus according to the present invention.

FIG. 14 illustrates a seventh embodiment of the present invent ion directed to an optical device apparatus. The seventh embodiment is different from the first embodiment only in that an optical fiber 16 with a concave end face 75 and a thick resist layer with a two-step guide hole are used in the seventh embodiment.

The thick resist layer includes a lower layer 60 of photosensitive resin with a thickness of 100 $\mu$m and a hole 62 of 150 $\mu$m $\phi$ smaller than that of a cladding 74 of the optical fiber 16, and an upper layer 61 of photosensitive resin with a thickness of 200 $\mu$m and a fiber guide hole 63 of 300 $\mu$m$\phi$ larger than that of the cladding 74 of the optical fiber 16

The plastic optical fiber (POF) 16 includes a core 73 and the cladding 74 formed of perfluorinated-polymer. The concave end face 75 is formed by removing a protective layer of acrylic fiber (not shown) and then pushing the core 73 and the cladding 74 against a heated spherical convex mold. The hole 62 is filled with a curable resin 76 whose refractive index is larger than that of the perfluorinated-polymer. The resin 76 is dropped on the concave end face 75 of the optical fiber 16, and the optical fiber 16 is then inserted in the guide hole 63. Thus, surroundings of the POF 16 are filled with the curable resin 76.

In this embodiment, the concave end face 75 is caused to abut on a step portion of the lower layer 60 such that the optical fiber 16 is not brought into contact with the optical device. The curable resin 76 placed in front of the concave end face 75 functions as a convex lens. Hence, the POF 16 can be effectively coupled to the optical device right below the end face 75. In this structure, the thickness of the lower layer 60 can be controlled according to the focal length of the convex lens.

Eighth Embodiment

The eighth embodiment is directed to a high-speed optical wiring device which is constructed as an optical interconnection module by using the above-discussed optical device apparatus. In this connector module, the surface emitting laser or the surface light-receiving device is optically coupled to the optical fiber using the guide hole formed in the thick resist layer, as described in the above embodiments.

Figure 15A:
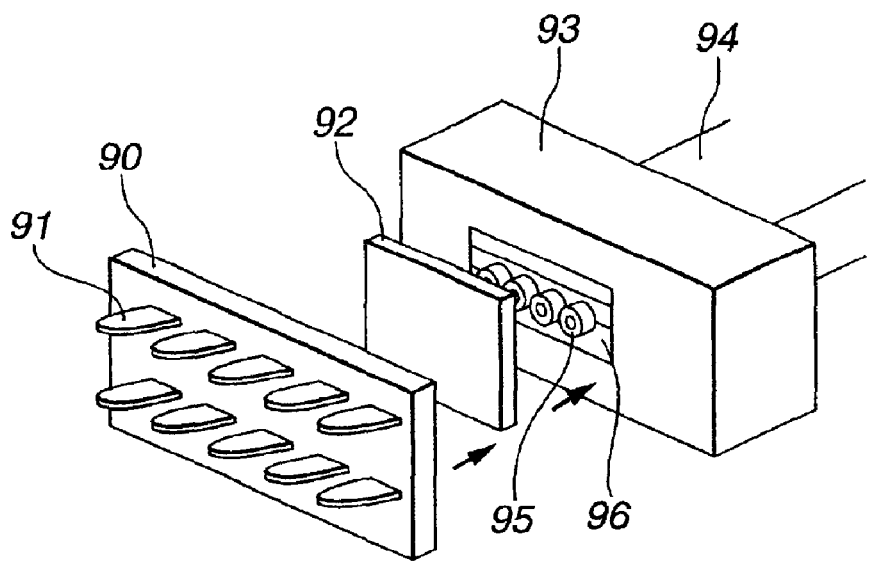
FIG. 15A is a perspective view illustrating an eighth embodiment of an optical interconnection module according to the present invention.
Figure 15B:
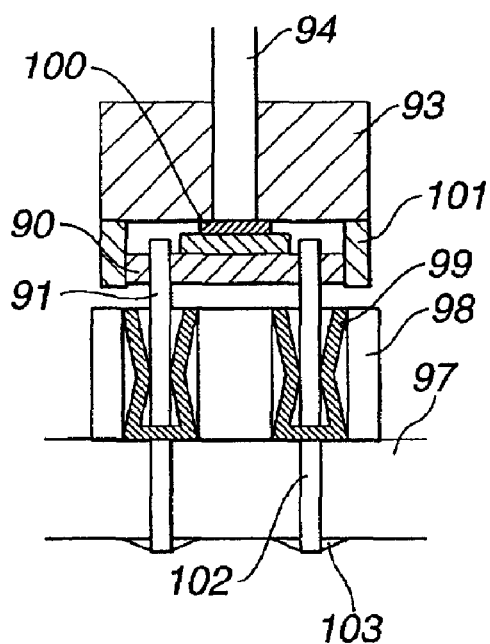
FIG. 15B is a cross-sectional view illustrating the eighth embodiment.
Figure 15C:
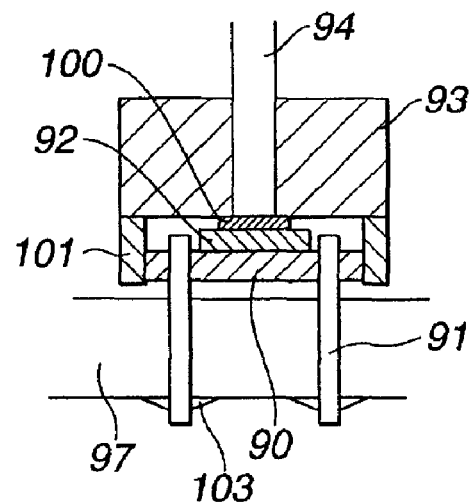
FIG. 15C is a cross-sectional view illustrating a modification of the eighth embodiment.
Figure 16:
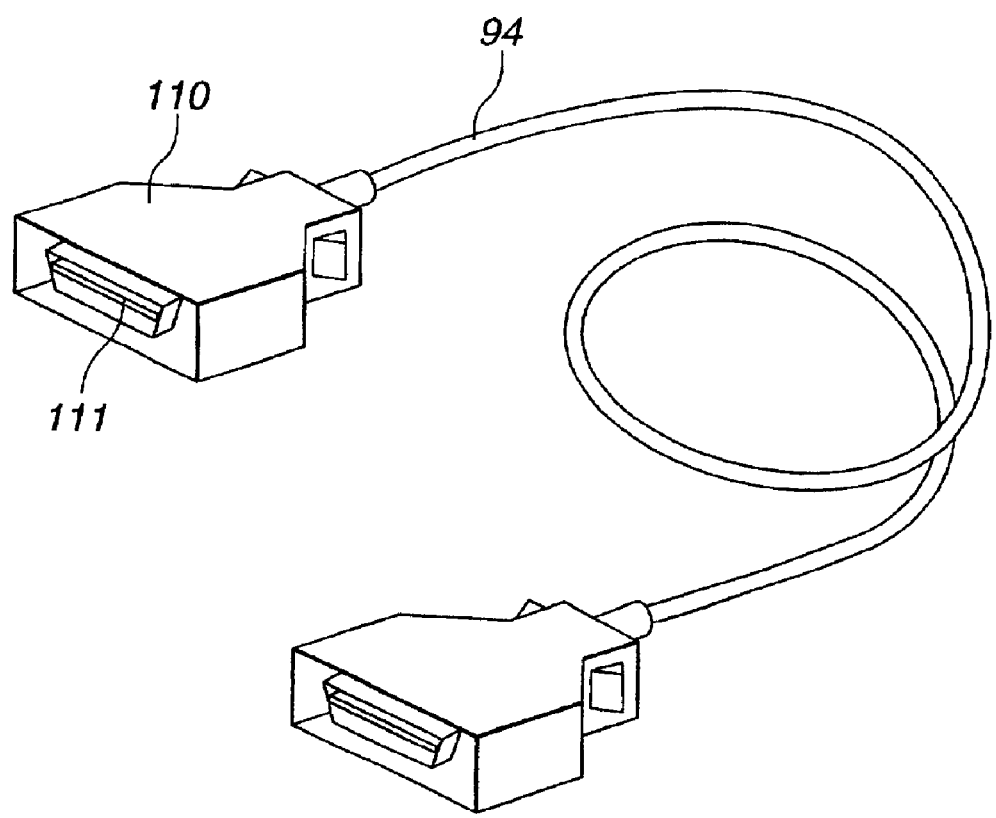
FIG. 16 is a perspective view illustrating a ninth embodiment of an optical wiring apparatus according to the present invention.

In the eighth embodiment, a ribbon optical fiber 94 consisting of four bundled POFs 95 includes a POF fixing jig 96 and a cover 93 for reinforcing the fixing strength of the POFs 95. In FIGS. 15A to 15C, the end face of the POF 95 is depicted as a flat face, but it can be a concave or convex face. An implement substrate 92 illustrated as the substrate 1 in FIG. 4 includes a circuit with a chip resistor and a capacitor integrated thereon, in addition to the optical device. Connecting leads 91 are fixed to a base plate 90 as illustrated in FIG. 15A. The base plate 90 is bonded to the bottom face of the substrate 92, and electrode pads on the substrate 92 are electrically connected to tops of the connecting leads 91 through a wire bonding. The substrate 92 is bonded to the POFs 95 after the wire bonding is finished. The electrical connection between the connecting leads 91 and the substrate 92 can also be achieved in a flip-chip manner by forming through-holes in the substrate 92.

FIGS. 15B and 15C respectively illustrate implementation manners between the connector module and a circuit board 97. In FIG. 15B, a socket 98 is fixed to the board 97 by a lead 102 and a solder 103. The connecting lead 91 in the connector module is removably brought into contact with a leaf spring 99 in the socket 98. In FIG. 15C, the connecting lead 91 is directly fixed to the board 97 with the solder 103.

An optical wiring apparatus for a high-speed transmission between boards can be achieved by the above-discussed structure. Such an apparatus is effective where the transmission speed exceeds 1 Gbps per channel or where electromagnetic radiation noises need to be eliminated.

The optical device apparatus is fixed to the circuit board 97 in FIG. 15C, but such a construction can be modified into a structure in which the optical fibers 95 bundled by the fiber fixing jig 96 are removably inserted into the fiber guide holes in a thick resist layer 100 without fixing the fixing jig 96 to the substrate 92. In such a case, a hook or the like may be formed on an extended portion 101 of the reinforcement cover 93 to construct a removably-attachable mechanism, for example.

Ninth Embodiment

The ninth embodiment is directed to an electric connector 110 with an electric connecting pin 111, which contains an optical transmission/reception module with the integrated optical device as described in the eighth embodiment. The ninth embodiment can be removably attached to an interface portion of electronic equipment, such as a personal computer (PC), a monitor, a printer, a digital camera, a camcorder, a digital video camera, and mobile equipment. The electric connector 110 can be constructed according to a standard of the equipment. For example, the electric connector 110 is constructed as an MDR connector with twenty-six (26) pins fabricated according to a standard of a digital monitor interface for connecting a PC and a liquid crystal (LC) displayr, or the electric connector 110 is applied to the standard of IEEE1394, USB (Universal Serial Bus), or the like. Furthermore, the electric connector 110 can be applied to an internal connection between a scanner portion and a photosensitive portion in a digital copying apparatus. When the optical wiring apparatus of this invention is used for interconnection between electronic equipment, a signal transmission in a transmission-speed range between 1 Gbps and 2.5 Gbps is possible with four or five channels and over a distance of more than 50 m. This can replace a high-speed video transmission via an electric cable whose transmission speed is limited. In that optical transmission, no electromagnetic radiation noise is generated in the optical transmission line, and noise-preventing measures can be alleviated in a rapid digital transmission.

Except as otherwise disclosed herein, the various components shown in outline or block form in any of FIGS. 1–16 are individually well known in the optical device, electronic circuit devices, and IC techniques, and their internal construction and operation are therefore not described herein.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A surface optical device apparatus comprising:
   a surface optical device arranged on a substrate, said surface optical device being capable of emitting or receiving light through a surface of said surface optical device; and
   a layer formed of a photosensitive or electron-beam-curable material, in which a guide hole for inserting an end portion of a light-transmission member therein is formed at a position corresponding to said surface of said surface optical device such that said surface optical device can be optically coupled to said light-transmission member inserted in said guide hole,
   wherein said guide hole is formed in said layer by performing a patterning on said layer using photolithography, and
   wherein a portion of said layer is closer to said substrate than is the bottom of said guide hole.

2. The surface optical device apparatus of claim 1, wherein said curable material is a polymerizable resist.

3. The surface optical device apparatus of claim 1, wherein a thickness of said layer is in a range between 10 μm and 1000 μm.

4. The surface optical device apparatus of claim 1, wherein said layer comprises a lower layer with a hole a size of which is smaller than a size of said light-transmission member and which transmits light therethrough, and an upper layer, formed on said lower layer, with a guide hole for fixing said light-transmission member therein, and a distance between said surface of said surface optical device through which light can be emitted or received and an end face of said light-transmission member is regulated by a thickness of said lower layer.

5. The surface optical device apparatus of claim 1, wherein said guide hole is contoured corresponding to an outer shape of said light-transmission member.

6. The surface optical device apparatus of claim 1, wherein said guide hole consists of a portion contoured corresponding to an outer shape of said light-transmission member and a groove connected to said portion.

7. The surface optical device apparatus of claim 1, wherein a plurality of said surface optical devices are arrayed, and a plurality of said guide holes are arrayed corresponding to said arrayed surface optical devices.

8. The surface optical device apparatus of claim 1, wherein said surface optical device comprises a surface light-emitting device only.

9. The surface optical device apparatus of claim 8, wherein said surface light-emitting device comprises a vertical cavity surface emitting laser (VCSEL).

10. The surface optical device apparatus of claim 8, wherein said surface light-emitting device comprises a surface emitting laser with only a functional layer including an active layer, a cavity layer and distributed Bragg reflector (DBR) mirror layers sandwiching said active layer.

11. The surface optical device apparatus of claim 8, wherein said surface light-emitting device comprises a light emitting diode (LED).

12. The surface optical device apparatus of claim 1, wherein said surface optical device comprises a surface light-receiving device only.

13. The surface optical device apparatus of claim 1, wherein there is a plurality of surface optical devices and said plurality of surface optical devices comprise at least a surface light-emitting device and at least a surface light-receiving device.

14. The surface optical device apparatus of claim 13, wherein said surface light-emitting device comprises a vertical cavity surface emitting laser (VCSEL).

15. The surface optical device apparatus of claim 13, wherein said surface light-emitting device comprises a surface emitting laser with only a functional layer including an active layer, a cavity layer and distributed Bragg reflector (DBR) mirror layers sandwiching said active layer.

16. The surface optical device apparatus of claim 13, wherein said surface light-emitting device comprises a light emitting diode (LED).

17. The surface optical device apparatus of claim 1, wherein said surface optical device comprises a thinned surface optical device without a growth substrate or with a thinned growth substrate.

18. The surface optical device apparatus of claim 1, wherein said surface optical device comprises a surface optical device with a growth substrate.

19. An optical apparatus comprising:
   a substrate;
   a surface optical device arranged on said substrate, said surface optical device being capable of emitting or receiving light through a surface of said surface optical device;
   a light-transmission member optically coupled to said surface optical device; and
   a layer formed of a photosensitive or electron-beam-curable material, in a which a guide hole for inserting an end portion of said light-transmission member therein is formed at a position corresponding to said surface of said surface optical device such that said surface optical device is optically coupled to said light-transmission member inserted in said guide hole, wherein said guide hole is formed in said layer by performing a patterning on said layer using photolithography, and wherein a portion of said layer is closer to said substrate than is the bottom of said guide hole.

20. The optical apparatus of claim 19, further comprising an electronic device provided on said substrate in a hybrid manner, said electronic device being electrically connected to said surface optical device.

21. The optical apparatus of claim 19, wherein a plurality of said surface optical devices are arrayed, and a plurality of said guide holes are arrayed corresponding to said arrayed surface optical devices.

22. The optical apparatus of claim 19, wherein said light-transmission member comprises an optical fiber.

23. The optical apparatus of claim 22, wherein said optical fiber comprises a polymer-containing plastic optical fiber.

24. The optical apparatus of claim 23, wherein said optical fiber comprises a polymer-containing plastic optical fiber with a lens-shaped end portion.

25. The optical apparatus of claim 24, wherein said lens-shaped end portion of said polymer-containing plastic optical fiber is shaped into a concave portion, and said concave portion is filled with a resin having a refractive index larger than a refractive index of said plastic optical fiber.

26. The optical apparatus of claim 24, wherein said lens-shaped end portion of said polymer-containing plastic optical fiber is shaped into a convex portion, and a space between said convex portion and said surface optical device is filled with a resin having a refractive index smaller than a refractive index of said plastic optical fiber.

27. The optical apparatus of claim 24, wherein a space between an end face of said optical fiber and said surface optical device is filled with an inert gas.

28. The optical apparatus of claim 24, wherein said lens-shaped end position of said polymer-containing plastic optical fiber is shaped into a convex portion.

29. The optical apparatus of claim 24, wherein said lens-shaped end portion of said polymer-containing plastic optical fiber is formed by pressing an end face of said optical fiber against a heated concave or convex mold.

30. The optical apparatus of claim 24, wherein said lens-shaped end portion of said polymer-containing plastic optical fiber is formed by immersing an end portion of said optical fiber in an organic solvent and lifting said end portion from the organic solvent to dry said end portion.

31. The optical apparatus of claim 23, wherein said plastic optical fiber is perfluorinated-polymer-containing optical fiber.

32. The optical apparatus of claim 23, wherein said plastic optical fiber is a polymethylmethacrylate (PMMA)-containing optical fiber.

33. The optical apparatus of claim 22, wherein said optical fiber comprises a silica-containing optical fiber.

34. The optical apparatus of claim 22, further comprising a resin filling a space between an end face of said optical fiber and said surface optical device.

35. The optical apparatus of claim 34, wherein said resin is a curable resin.

36. The optical apparatus of claim 35, wherein said curable resin is an optical adhesive or a transparent resin.

37. The optical apparatus of claim 19, wherein said substrate is formed of a material which has a heat sink function.

38. An optical wiring apparatus in a form of an optical interconnection module for performing an optical interconnection between boards in electronic equipment, said apparatus comprising:

a substrate;

a surface optical device arranged on said substrate, said surface optical device being capable of emitting or receiving light through a surface of said surface optical device;

a light-transmission member optically coupled to said surface optical device to perform optical transmission and reception through said light-transmission member;

a layer formed of a photosensitive or electron-beam-curable material, in which a guide hole for inserting an end portion of said light-transmission member therein is formed at a position corresponding to said surface of said surface optical device such that said surface optical device is optically coupled to said light-transmission member inserted in said guide hole, wherein said guide hole is formed in said layer by performing a patterning on said layer, and wherein a portion of said layer is closer to said substrate than is the bottom of said guide hole;

an electronic circuit for driving and controlling said surface optical device, said electronic circuit being provided on said substrate and electrically connected to said surface optical device; and a base member with an electric connection lead for electrically connecting said surface optical device and said electronic circuit to the board in the electronic equipment, said substrate being attached on said base member, and said electric connection lead being fixed to said base member and being electrically connected to said surface optical device and said electronic circuit.

39. The optical wiring apparatus of claim 38, wherein said light-transmission member comprises an optical fiber.

40. An optical wiring apparatus in a form of an electric connector for performing an optical interconnection between electronic equipment, said apparatus comprising:

a substrate;

a surface optical device arranged on said substrate, said surface optical device being capable of emitting or receiving light through a surface of said surface optical device;

a light-transmission member optically coupled to said surface optical device to perform optical transmission and reception through said light-transmission member;

a layer formed of a photosensitive or electron-beam-curable material, in which a guide hole for inserting an end portion of said light-transmission member therein is formed at a position corresponding to said surface of said surface optical device such that said surface optical device is optically coupled to said light-transmission member inserted in said guide hole, wherein said guide hole is formed in said layer by performing a patterning on said layer using photolithography, and wherein a portion of said layer is closer to said substrate than is the bottom of said guide hole;

an electronic circuit for driving and controlling said surface optical device, said electronic circuit being provided on said substrate and electrically connected to said surface optical device; and an electric connection pin for electrically connecting said surface optical device and said electronic circuit to the electronic equipment, said electric connection pin being electrically connected to said surface optical device and said electronic circuit, and said electric connection pin being removably connectable to a receptacle in the electronic equipment.

41. The optical wiring apparatus of claim 40, wherein said light-transmission member comprises an optical fiber.

42. A method of fabricating a plurality of optical apparatuses in a collective manner, said method comprising the steps of:

(a) forming a plurality of functional layers of a plurality of surface optical devices on a growth substrate;

(b) forming a plurality of sets of electric wiring patterns on a plurality of respective areas of an implement substrate;

(c) bonding at least a surface optical device, which is cut from said growth substrate with said plurality of functional layers of said plurality of surface optical devices, to each of said plurality of respective areas of said implement substrate;

(d) forming a layer of a photosensitive or electron-beam-curable material with a guide hole on said surface optical device using photolithography such that a portion of said layer is closer to said implement substrate than is the bottom of said guide hole;

(e) implementing an electronic device on each of said plurality of respective areas of said implement substrate in a flip-chip manner;

(f) dicing said implement substrate such that each of said plurality of respective areas of said implement substrate is separated from the others of said plurality of respective areas of said implement substrate; and (g) inserting a light-transmission member into said guide hole such that said surface optical device is optically coupled to said light-transmission member inserted in said guide hole.

43. The method of claim 42, wherein the light-transmission member is an optical fiber.

44. An optical apparatus comprising:

a surface optical device arranged on a substrate, said surface optical device being capable of emitting or receiving light through a surface of said surface optical device; and a layer formed of a photosensitive or electron-beam-curable material, in which a guide hole for inserting an end portion of a light-transmission member therein is formed at a position corresponding to said surface of said surface optical device such that said surface optical device can be optically coupled to said light-transmission member inserted in said guide hole, wherein said guide hole is formed in said layer by performing a patterning on said layer using photolithography, and wherein a portion of said layer is closer to said substrate than is the bottom of said guide hole.

* * * * *